United States Patent
Tsukada (10) Patent No.: US 12,422,557 B2
(45) Date of Patent: Sep. 23, 2025

(54) OBJECT RECOGNITION ABNORMALITY DETECTION APPARATUS, OBJECT RECOGNITION ABNORMALITY DETECTION PROGRAM PRODUCT, AND OBJECT RECOGNITION ABNORMALITY DETECTION METHOD

(71) Applicant: DENSO CORPORATION, Kariya (JP)

(72) Inventor: Akihiro Tsukada, Kariya (JP)

(73) Assignee: DENSO CORPORATION, Kariya (JP)

( * ) Notice: Subject to any disclaimer, the term of this patent is extended or adjusted under 35 U.S.C. 154(b) by 870 days.

(21) Appl. No.: 17/654,015

(22) Filed: Mar. 8, 2022

(65) Prior Publication Data

US 2022/0196841 A1    Jun. 23, 2022

Related U.S. Application Data (63) Continuation of application No. PCT/JP2020/033957, filed on Sep. 8, 2020.

(30) Foreign Application Priority Data

Sep. 10, 2019  (JP) ................. 2019-164861

(51) Int. Cl.
*G01S 17/894* (2020.01)
*G01S 17/08* (2006.01)
(Continued)

(52) U.S. Cl.
CPC ............ *G01S 17/894* (2020.01); *G01S 17/08* (2013.01); *G01S 17/58* (2013.01); *G06V 20/58* (2022.01)

(58) Field of Classification Search
CPC ........ G01S 17/894; G01S 17/08; G01S 17/58; G06V 20/58
See application file for complete search history.

(56) References Cited

U.S. PATENT DOCUMENTS

| 7,164,117 | B2 * | 1/2007 | Breed ................. G01S 7/417 250/221 |
| 12,252,120 | B2 * | 3/2025 | Caldwell ............. G06V 20/58 |
| 2020/0364456 | A1 * | 11/2020 | Tran .................. G06T 7/0004 |

FOREIGN PATENT DOCUMENTS

| JP | 2018-097765 A | 6/2018 |
| JP | 2021-043679 A | 3/2021 |
| JP | 2021-050945 A | 4/2021 |

OTHER PUBLICATIONS

Dooley et al., "A Blind-Zone Detection Method Using a Rear-Mounted Fisheye Camera With Combination of Vehicle Detection Methods", Jan. 2016, IEEE Publication, vol. 17, No. 1, pp. 264-278 (Year: 2016).*

(Continued)

*Primary Examiner* — Elias Desta
(74) *Attorney, Agent, or Firm* — MASCHOFF BRENNAN (57) ABSTRACT

An object recognition abnormality detection apparatus, which is equipped to a vehicle and detects an abnormality occurred in a peripheral object recognition of the vehicle using a distance measuring sensor and an external view camera, is configured to: acquire a speed state of the vehicle; acquire the background light image from a distance measuring sensor; acquire a camera image from an external view camera; and detect a projection error between the background light image and the camera image under a condition that the background light image and the camera image are generated in a state where a speed of the vehicle is within a range lower than a predetermined speed.

10 Claims, 4 Drawing Sheets

(51) Int. Cl.
*G01S 17/58* (2006.01)
*G06V 20/58* (2022.01)

(56) References Cited

OTHER PUBLICATIONS

U.S. Appl. No. 17/654,012 and its entire file history, filed Mar. 8, 2022, Tsukada.
U.S. Appl. No. 17/655,424 and its entire file history, filed Mar. 18, 2022, Tsukada.

* cited by examiner

OBJECT RECOGNITION ABNORMALITY DETECTION APPARATUS, OBJECT RECOGNITION ABNORMALITY DETECTION PROGRAM PRODUCT, AND OBJECT RECOGNITION ABNORMALITY DETECTION METHOD

CROSS REFERENCE TO RELATED APPLICATION

The present application is a continuation application of International Patent Application No. PCT/JP2020/033957 filed on Sep. 8, 2020, which designated the U.S. and claims the benefit of priority from Japanese Patent Application No. 2019-164861 filed on Sep. 10, 2019. The entire disclosures of all of the above applications are incorporated herein by reference.

TECHNICAL FIELD

The present disclosure relates to a technical field of abnormality detection in recognition of an object existing around a vehicle.

BACKGROUND

There has been known a device that recognizes a peripheral object of a vehicle using detection results of a distance measuring sensor and an external view camera.

SUMMARY

The present disclosure provides an object recognition abnormality detection apparatus, which is equipped to a vehicle and detects an abnormality occurred in a peripheral object recognition of the vehicle using a distance measuring sensor and an external view camera. The object recognition abnormality detection apparatus is configured to: acquire a speed state of the vehicle; acquire the background light image from a distance measuring sensor; acquire a camera image from an external view camera; and detect a projection error between the background light image and the camera image under a condition that the background light image and the camera image are generated in a state where a speed of the vehicle is within a range lower than a predetermined speed.

BRIEF DESCRIPTION OF DRAWINGS

Objects, features and advantages of the present disclosure will become apparent from the following detailed description made with reference to the accompanying drawings. In the drawings.

DETAILED DESCRIPTION

There has been known a device that recognizes a peripheral object of a vehicle using detection results of a distance measuring sensor and an external view camera. The device determines whether a reliability of object detection result is sufficient and determines whether an object detection state is stable, based on an image lost state of the object included in the image.

The distance measuring sensors and the external view camera are equipped to the vehicle, which moves to various environments. Thus, an abnormality may occur in peripheral object recognition due to an abnormality occurred in the distance measuring sensor or occurred in the external view camera. The above-described apparatus may fail to detect the abnormality occurred in peripheral object recognition caused by the distance measuring sensor or the external view camera.

According to an aspect of the present disclosure, an object recognition abnormality detection apparatus equipped to a vehicle and detecting an abnormality occurred in a peripheral object recognition of the vehicle using a distance measuring sensor and an external view camera is provided. The distance measuring sensor is equipped to the vehicle and generates a reflected light image, which includes distance information, by emitting light toward an object and sensing, with a light receiving element, reflected light from the object. The distance measuring sensor further generates a background light image, which has a same coordinate system as a coordinate system of the reflected light image, by sensing, with the light receiving element, background light with respect to the reflected light, the external view camera is equipped to the vehicle and generates a camera image by sensing incident light with a camera element. The object recognition abnormality detection apparatus includes: a speed state acquiring unit acquiring a speed state of the vehicle; an image information acquisition unit acquiring the background light image and the camera image; and a projection error detection unit detecting a projection error between the background light image and the camera image under a condition that the background light image and the camera image are generated in the speed state where a speed of the vehicle is within a range lower than a predetermined speed.

According to another aspect of the present disclosure, an object recognition abnormality detection program product stored in a computer-readable non-transitory storage medium is provided. The program product includes instructions to be executed by at least one processor for detecting an abnormality occurred in a peripheral object recognition of a vehicle, and the instructions include: acquiring a reflected light image and a background light image from a distance measuring sensor equipped to the vehicle, the distance measuring sensor generating the reflected light image, which includes distance information, by emitting light toward an object and sensing, with a light receiving element, reflected light from the object, and the distance measuring sensor further generating the background light image, which has a same coordinate system with the reflected light image, by sensing, with the light receiving element, background light with respect to the reflected light; acquiring a camera image generated by an external view camera equipped to the vehicle, the external view camera generating the camera image by sensing incident light with a camera element; and detecting a projection error between the background light image and the camera image under a condition that the background light image and the camera image are generated in a speed state where a speed of the vehicle is within a range lower than a predetermined speed.

According to another aspect of the present disclosure, an object recognition abnormality detection method of detecting an abnormality occurred in a peripheral object recognition of a vehicle is provided. The method is executed by at least one processor and includes: acquiring a reflected light image and a background light image from a distance measuring sensor equipped to the vehicle, the distance measuring sensor generating the reflected light image, which includes distance information, by emitting light toward an object and sensing, with a light receiving element, reflected light from the object, and the distance measuring sensor further generating the background light image, which has a same coordinate system with the reflected light image, by sensing, with the light receiving element, background light with respect to the reflected light; acquiring a camera image generated by an external view camera equipped to the vehicle, the external view camera generating the camera image by sensing incident light with a camera element; and detecting a projection error between the background light image and the camera image under a condition that the background light image and the camera image are generated in a speed state where a speed of the vehicle is within a range lower than a predetermined speed.

In the above-described aspects of the present disclosure, the projection error between the background light image and the camera image is detected in a state where the speed of the vehicle is within a range lower than the predetermined speed. In such a speed state, it is possible to suppress a decrease in detection accuracy, which is caused by a measurement time difference between a measurement time of the background light image generated by the distance measuring sensor and a measurement time of the camera image generated by the external view camera. When the vehicle moves during the measurement time difference, a position of the object included in the background light image is different from a position of the object included in the camera image. By detecting the projection error in the above-described speed state, it is possible to reduce the position difference between the background light image and the camera image. Thus, even when the position difference is included in the projection error, it is possible to suppress an increase of the projection error that is caused by the position difference. Thus, it is possible to detect, with a high accuracy, an abnormality occurred in the recognition of peripheral object existing around the vehicle using the distance measuring sensor and the external view camera.

The following will describe an embodiment of the present disclosure with reference to the drawings.

First Embodiment

Figure 1:
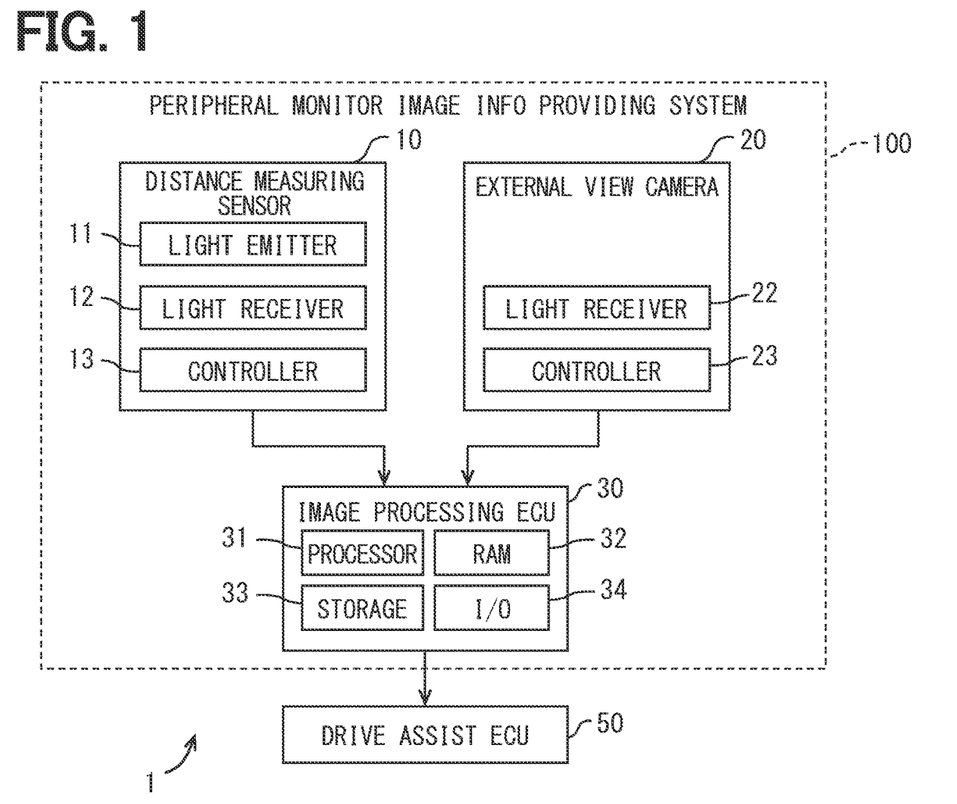
FIG. 1 is a diagram showing an overall configuration of a peripheral monitoring image information system and a driving assist ECU according to a first embodiment of the present disclosure.

As shown in FIG. 1, an object recognition abnormality detection apparatus according to a first embodiment of the present disclosure is used for recognizing a peripheral object of the vehicle 1, and is provided by an image processing electronic control unit (ECU) 30 equipped to the vehicle 1.

The image processing ECU 30 constitutes a peripheral monitoring image information providing system 100 together with a distance measuring sensor 10 and an external view camera 20. The peripheral monitoring image information providing system 100 of the present embodiment can provide, to a driving assist ECU 50 or the like, peripheral monitoring image information based on the measurement results of the distance measuring sensor 10 and the external view camera 20.

The image processing ECU 30 is communicably connected to a communication bus of an in-vehicle network equipped to the vehicle 1. The image processing ECU 30 is one of nodes connected to the in-vehicle network. The distance measuring sensor 10, the external view camera 20, and the driving assist ECU 50 are also connected to the communication bus of the in-vehicle network as nodes.

The driving assist ECU 50 mainly includes a computer equipped with a processor, random access memory (RAM), a storage unit, an input/output interface, and a bus connecting these elements. The driving assist ECU 50 includes at least one of a driving assist function that assists the driver's driving operation of the vehicle 1 or a substitute driving function that substitutes the driver's driving operation of the vehicle 1. The driving assist ECU 50 recognizes, by executing an object recognition program stored in a storage medium using the processor, the peripheral object of the vehicle 1 based on the peripheral monitoring image information provided by the peripheral monitoring image information providing system 100. The driving assist ECU 50 performs autonomous driving or advanced driving assist of the vehicle 1 according to the recognition result acquired by executing the program stored in the storage medium using the processor.

Figure 3:
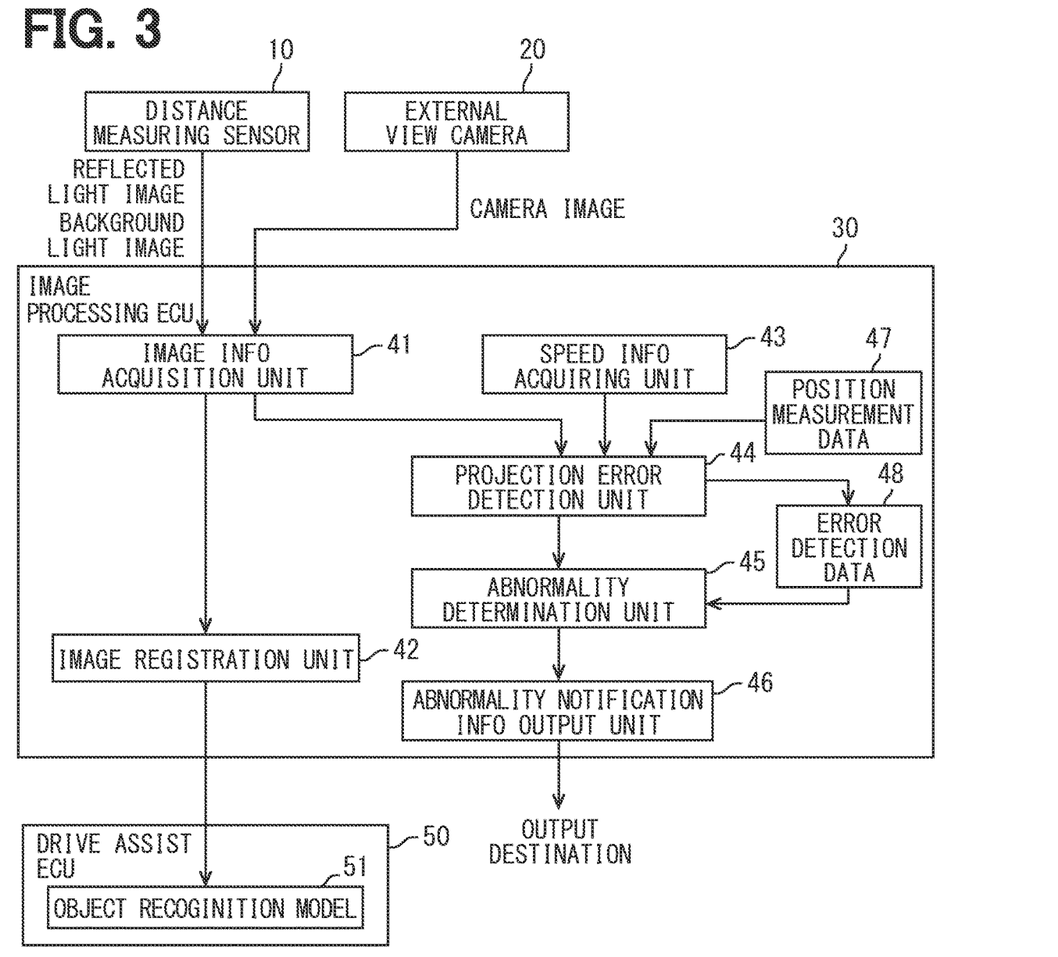
FIG. 3 is a diagram showing a configuration of an image processing ECU according to the first embodiment.

By executing the object recognition program, the driving assist ECU 50 performs peripheral object recognition using, for example, semantic segmentation. The storage of the driving assist ECU 50 includes an object recognition model 51 as shown in FIG. 3, and the object recognition model mainly includes a neural network as one component of the object recognition program. The neural network may include a structure known as SegNet in which an encoder is combined with a decoder. For example, the peripheral object recognition may be carried using a bounding box method.

The following will describe details of the distance measuring sensor 10, the external view camera 20, and the image processing ECU 30 included in the peripheral monitoring image information providing system 100.

Figure 2:
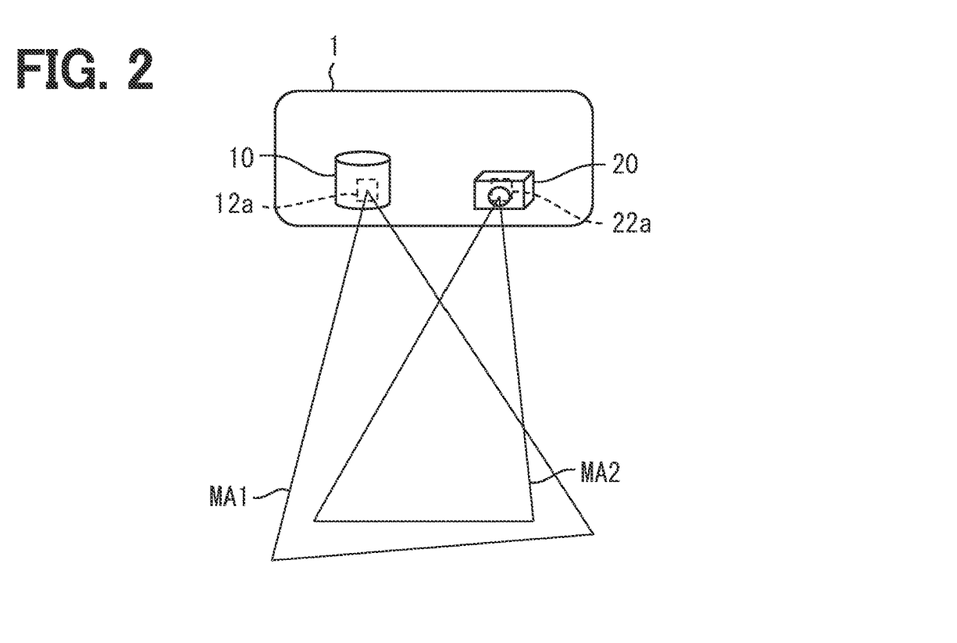
FIG. 2 is a diagram showing a distance measuring sensor and an external view camera mounted to a vehicle according to the first embodiment.

The distance measuring sensor 10 may be provided by a single photon avalanche diode light detection and ranging (SPAD LiDAR) disposed on a front portion of the vehicle 1 or on a roof of the vehicle 1. The distance measuring sensor 10 measures a distance at least within a front range MA1 of the vehicle 1 among a periphery area of the vehicle 1. The front range MA1 measured by the measuring sensor 10 is also referred to as a front measurement range MA1.

The distance measuring sensor 10 includes a light emitter 11, a light receiver 12, a controller 13, and the like. The light emitter 11 emits a light beam from a light source toward the measurement range MA1 as shown in FIG. 2 by scanning the measurement range using a movable optical member, such as a polygon mirror. For example, the light source may be a semiconductor laser, such as a laser diode. The light source emits, corresponding to an electric signal provided by the controller 13, the light beam of near infrared region. The light beam of near infrared region is invisible to an occupant, such as a driver in the vehicle and other people outside of the vehicle.

The light receiver 12 collects, within the measurement range MA1, the reflected light from the object or background light relative to the reflected light by, for example, a condenser lens, and controls the collected light beam to enter a light receiving element 12a of the light receiver 12.

The light receiving element 12a converts the received light into an electric signal by photoelectric conversion. The light receiving element 12a may be provided by a SPAD light receiving element that has a high sensitivity by amplifying a detection voltage. For example, the light receiving element 12a may be provided by a CMOS sensor that has a high sensitivity in the near infrared region compared with the visible region for detecting the reflected light of the near infrared region. This sensitivity of the light receiving element 12a may be adjusted by providing an optical filter in the light receiver 12. The light receiving element 12a has multiple light receiving pixels arranged as an array in one-dimensional direction or two-dimensional directions.

The controller 13 controls operations of the light emitter 11 and the light receiver 12. For example, the controller 13 may be arranged on a common substrate together with the light receiving element 12a. The controller 13 mainly includes a broad-meaning processor, such as a microcomputer or a field-programmable gate array (FPGA). The controller 13 has a scanning control function, a reflected light measuring function, and a background light measuring function.

The scanning control function is a function for controlling scanning of light beam. The controller 13 oscillates the light beam emitted from the light source by multiple times to have a pulse shape based on an operating clock of a clock oscillator included in the distance measuring sensor 10, and operates the movable optical member.

The reflected light measuring function is a function of reading out, according to the scan timing of the light beam, a voltage value corresponding to the reflected light received by each light receiving pixel with, for example, a rolling shutter method, and measuring an intensity of the received reflected light. In the measurement of the reflected light, a distance from the distance measuring sensor 10 to the object on which the light beam is reflected can be measured by detecting a time difference between the emission time of the light beam and the receiving time of the reflected light. By measuring the reflected light, the controller 13 generates, as a reflected light image ImR, image data in which the intensity of the reflected light is associated with the distance information of the object on which the emitted light beam is reflected in two-dimensional coordinates of an image plane corresponding to the measurement range MA1.

The background light measurement function is a function of reading out a voltage value corresponding to the background light received by each light receiving pixel at a time point immediately before measuring of the reflected light, and measuring the intensity of the background light. Here, the background light is incident light entering the light receiving element 12a from the measurement range MA1 among the external area, and does not include the reflected light. The incident light includes natural light, display light emitted from an external display, and the like. By measuring the background light, the controller 13 can generate, as the background light image ImL, image-like data in which the intensity of the background light is associated with the two-dimensional coordinates in the image plane corresponding to the measurement range MA1.

The reflected light image ImR and the background light image ImL are sensed by the same light receiving element 12a, and acquired from the same optical system including the light receiving element 12a. Therefore, the coordinate system of the reflected light image ImR can be regarded as the same and coincident coordinate system as the coordinate system of the background light image ImL. Furthermore, there is almost no difference between the measurement time of the reflected light image ImR and the measurement time of the background light image ImL. For example, the time difference may be less than 1 nanosecond). Thus, the reflected light image ImR and the background light image ImL can be regarded as synchronized images.

In the present embodiment, the integrated image data in which three data channels including the intensity of the reflected light, the distance of the object, and the intensity of the background light are stored for each pixel is successively output to the image processing ECU 30 as the sensor image.

The external view camera 20 may be a camera arranged in a vehicle compartment close to a front windshield of the vehicle 1. The external view camera 20 is able to measure at least a measurement range MA2 set in front of the vehicle on external side. More specifically, the measurement range MA2 is set to at least partially overlap with the measurement range MA1 of the distance measuring sensor 10.

The external view camera 20 includes a light receiver 22 and a controller 23. The light receiver 22 collects incident light (background light) from the measurement range MA2 of external area by, for example, a light receiving lens, and controls the collected light to enter a camera element 22a of the light receiver 22.

The camera element 22a converts light into an electric signal by photoelectric conversion. For example, a CCD sensor or a CMOS sensor can be adopted as the camera element 22a. The camera element 22a is set to have high sensitivity in the visible region compared with the near infrared region in order to efficiently receive natural light in the visible region. The camera element 22a has multiple light receiving pixels (corresponding to sub-pixels) arranged as an array in two-dimensional directions. For example, red, green, and blue color filters may be arranged on the light receiving pixels adjacent to one another. Each light receiving pixel receives visible light of a color corresponding to the arranged color filter. By measuring the intensity of red light, the intensity of green light, and the intensity of blue light, the camera image ImC captured by the external view camera 20 has a higher resolution compared with the reflected light image ImR and the background light image ImL. The camera image may be a visible color image.

The controller 23 controls operations of the light receiver 22. For example, the controller 23 may be arranged on a common substrate together with the camera element 22a. The controller 23 mainly includes a broad-meaning processor, such as a microcomputer or a FPGA. The controller 23 has an image capturing function.

The image capturing function is a function for capturing a color image as described above. The controller 23 reads out, according to an operating clock of a clock oscillator included in the external view camera 20, a voltage value corresponding to the incident light received by each light receiving pixel using, for example, a global shutter method, and measures an intensity of the sensed incident light. The controller 23 can generate, as a camera image ImC, image-like data in which the intensity of incident light is associated with the two-dimensional coordinates on the image plane corresponding to the measurement range MA2. Such camera images ImC are successively output to the image processing ECU 30.

The image processing ECU 30 is an electronic control device that processes the peripheral monitoring image information in composite manner based on the measurement results of the distance measuring sensor 10 and the external view camera 20. As shown in FIG. 1, the image processing ECU 30 mainly includes a computer equipped with a processor 31, a RAM 32, a storage 33, an input/output interface 34, and a bus connecting these elements. The processor 31 is combined with the RAM 32, and is provided by a hardware for executing an arithmetic processing. The processor 31 includes at least one arithmetic core, such as a central processing unit (CPU), a graphical processing unit (GPU), or a reduced instruction set computer (RISC). The processor 31 may further include an FPGA and an IP core having different dedicated functions. The processor 31 executes, by accessing the RAM 32, various processes for functioning as the functional blocks described later. The storage 33 includes a non-volatile storage medium. The storage 33 stores various programs (object recognition abnormality detection program, etc.) to be executed by the processor 31.

The image processing ECU 30 includes functional blocks, and the functional blocks are provided by the processor 31 executing the program stored in the storage 33. Specifically, as shown in FIG. 3, the functional blocks include an image information acquisition unit 41, an image registration unit 42, a speed state acquiring unit 43, a projection error detection unit 44, an abnormality determination unit 45, and an abnormality notification information output unit 46.

In the image processing ECU 30, the storage 33 stores position measurement data 47 and projection error detection data 48. The position measurement data 47 includes data related to a positional relationship between the measurement position of the distance measuring sensor 10 and the measurement position of the external view camera 20. The data related to the positional relationship may include data indicating a position and an orientation of the light receiving element 12a of the distance measuring sensor 10 equipped to the vehicle 1, and may also include data indicating a position and an orientation of the camera element 22a of the external view camera 20 equipped to the vehicle 1. Alternatively, the data indicating values of components included in a transformation matrix, which is obtained by converting the above-described data, may be used as the data related to the positional relationship.

The projection error detection unit 44 stores, as the projection error detection data 48, projection detection result, and the abnormality determination unit 45 determines the abnormality using the stored projection error detection data. For example, the projection error detection data 48 may include multiple data sets each of which includes detection date and time, an image acquired from a detection source, and a detected projection error PE.

The image information acquisition unit 41 acquires the reflected light image ImR and the background light image ImL from the distance measuring sensor 10, and acquires the camera image ImC from the external view camera 20. The image information acquisition unit 41 provides, to the image registration unit 42 and the projection error detection unit 44, the latest set of the reflected light image ImR, the background light image ImL, and the camera image ImC.

The image registration unit 42 specifies a correspondence relationship between a coordinate system of the reflected light image ImR and the background light image ImL and a coordinate system of the camera image ImC. That is, the image registration unit 42 performs image registration to the reflected light image and the camera image. The image registration unit 42 successively provides, to the driving assist ECU 50, the reflected light image ImR, the back-ground light image ImL, and the camera image ImC after the image registration is performed to the images.

The speed state acquiring unit 43 acquires a speed state of the vehicle 1. For example, the speed state acquiring unit 43 may acquire the speed state of the vehicle 1 by acquiring a speed of the vehicle from a speed sensor equipped to the vehicle 1. Instead of acquiring the vehicle information from the speed sensor, the speed state acquiring unit 43 may compare two most recent background light images ImL with one another (or compare two most recent camera images ImC with one another), and estimate the speed state of the vehicle 1 based on the movement distance of the background included in the two most recent images.

Figure 4:
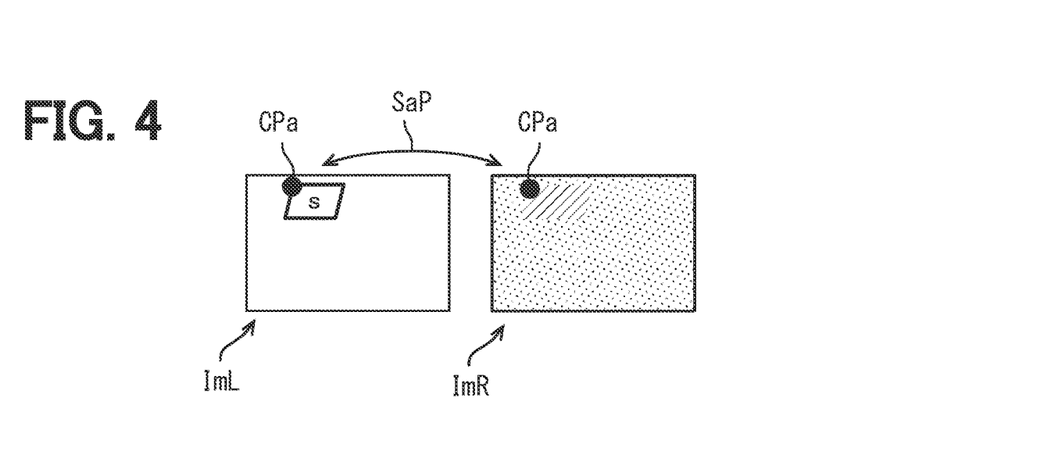
FIG. 4 is a diagram showing a corresponding point in a background light image in the first embodiment.
Figure 5:
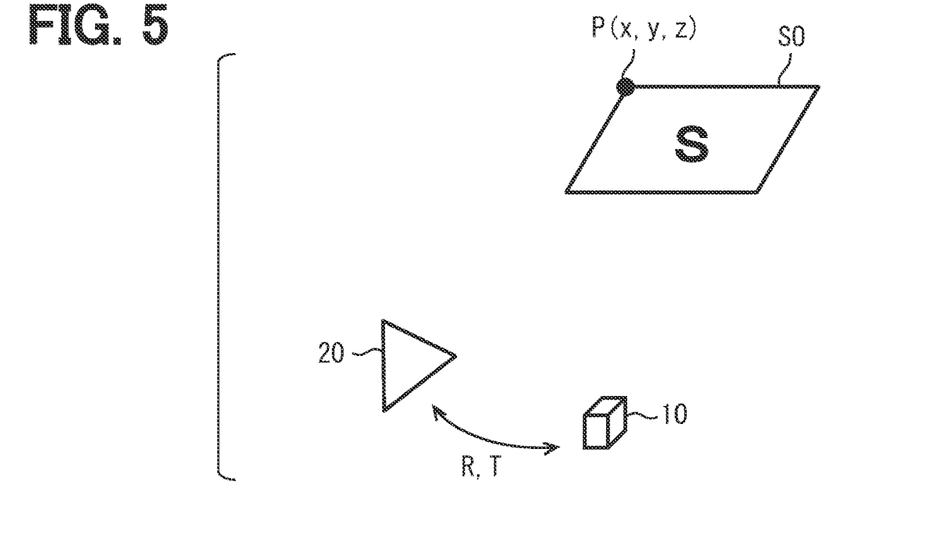
FIG. 5 is a diagram showing a relationship between the distance measuring sensor, the external view camera, and three-dimensional coordinates according to the first embodiment.
Figure 6:
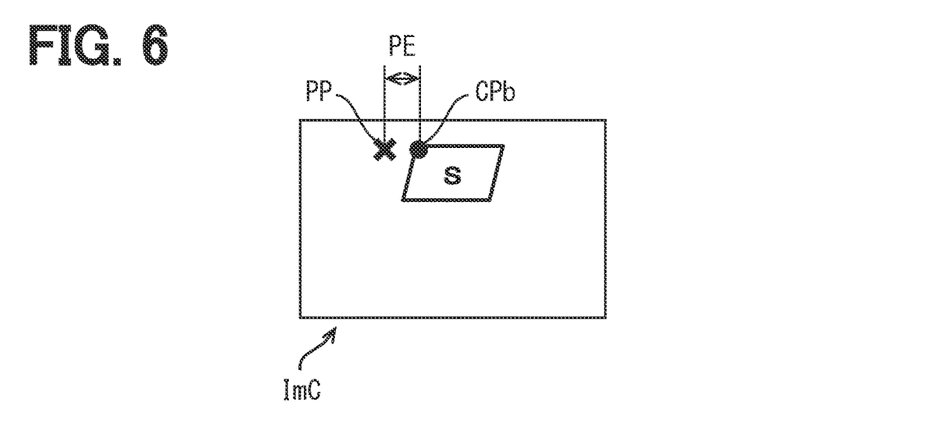
FIG. 6 is a diagram showing a corresponding point in a camera image, a projection position in the camera image, and a projection error in the camera image according to the first embodiment.

As shown in FIG. 4 to FIG. 6, the projection error detection unit 44 compares the background light image ImL with the camera image ImC, and detects the projection error PE between the background light image ImL and the camera image ImC. The projection error detection unit 44 has a speed state determination function, a corresponding point acquisition function, a corresponding point projection function, and a projection error measurement function.

The speed state determination function is a function for determining whether the speed state of the vehicle 1 is a condition suitable for detecting the projection error PE, in other words, determines whether a condition for executing a detection process of projection error PE is satisfied. In a motionless state of the vehicle 1, a position accuracy of a motionless object S measured by the distance measuring sensor 10 and a position accuracy of the motionless object SO measured by the external view camera 20 have substantially highest levels. Thus, the motionless state of the vehicle 1 is regarded as the condition suitable for detecting the projection error PE. There exists a measurement time difference between a measurement time of the distance measuring sensor 10 and a measurement time of the external view camera 20. In a moving state of the vehicle 1, a difference between a position of the motionless object S included in the background light image ImL and a position of the motionless object S included in the camera image ImC, which is caused by the measurement time difference, increases with an increase of the vehicle speed. Thus when the speed of the vehicle 1 increases, the condition of vehicle is not suitable for detecting the projection error PE.

Specifically, the projection error detection unit 44 determines whether the background light image ImL and the camera image ImC, which are detection targets of the projection error PE, are generated in the motionless state of the vehicle 1 based on the speed state acquired by the speed state acquiring unit 43. When the detection target images are generated in the motionless state of the vehicle, a process for detecting the projection error PE between the background light image ImL and the camera image ImC is executed. When the detection target images are not generated in the motionless state of the vehicle, the process for detecting the projection error PE between the background light image ImL and the camera image ImC is not executed or stopped.

The corresponding point acquisition function is a function of acquiring corresponding points CPa and CPb, respectively, from the background light image ImL and camera image ImC. Herein, the background light image ImL and camera image ImC are paired images, that is, images corresponding to one another. Corresponding points CPa and CPb are feature points (same point SaP) of a common motionless object S included in both of the background light image ImL and the camera image ImC as shown in FIG. 4 and FIG. 6. Corresponding point CPa is the feature point in the background light image ImL, and the corresponding point CPb is the feature point in the camera image ImC.

When the projection error detection unit 44 determines that the background light image ImL and the camera image ImC are generated in the motionless state, the motionless object S that is commonly reflected in both of the background light image ImL and the camera image ImC is extracted. The motionless object S to be extracted may be a motionless object having an outer shape to be easily extracted, such as a signboard, a sign plate, or a traffic light.

The projection error detection unit 44 acquires the feature points, for example, corners of the extracted motionless object S as corresponding points CPa and CPb. A pair of the corresponding points CPa and CPb or multiple pairs of corresponding points may be acquired, respectively, from the background light image ImL and the camera image ImC. In the present embodiment, the projection error detection unit 44 may acquire multiple pairs of corresponding points CPa, CPb in a case where the motionless object S includes multiple feature points, multiple motionless objects S are extracted, or multiple pairs of feature points are available. In FIG. 4 and FIG. 6, one pair of corresponding points CPa and CPb is shown as an example.

The corresponding point projection function is a function of projecting the corresponding point CPa in the background light image on the camera image for each pair of the acquired corresponding points CPa and CPb. As shown in FIG. 5, the projection error detection unit 44 identifies three-dimensional coordinates P (x, y, z) of the corresponding point CPa in the background light image ImL with reference to distance information of the reflected light image ImR. That is, the background light image ImL does not include distance information. The corresponding point CPa in an image plane of the background light image ImL has two-dimensional coordinate information. By combining the two-dimensional coordinate information of the corresponding point CPa with the distance information of the reflected light image ImR, the coordinate information of the corresponding point CPa can be extended to three-dimensional coordinate information. In the identification of the three-dimensional coordinates P (x, y, z), as shown in FIG. 4, the reflected light image ImR and the background light image ImL are regarded as the same coordinate system and are considered as synchronized images. The three-dimensional coordinate P (x, y, z) is defined as a coordinate system in which z-axis extending along a depth direction perpendicular to the image plane of the background light image ImL is added to the two-dimensional coordinates (x, y) of the background light image ImL.

The projection error detection unit 44 projects the three-dimensional coordinates P (x, y, z) of the corresponding point CPa in the back ground light image on the projection position PP of the camera image ImC by performing coordinate transformation using a transformation matrix. The projection position PP is set to be included in the image plane of the camera image ImC. The transformation matrix is a matrix, which applies, to the three-dimensional coordinates P (x, y, z), a rotation and parallel traveling operation, and then projects the converted coordinates on the background light image ImL. The transformation matrix may be described in a form of one matrix, or may be described in a form of a product of multiple matrices, for example, a product of a back projection matrix, a parallel traveling matrix T, and a rotation matrix R.

The projection error measurement function is a function of measuring, as the projection error PE, a position difference between the position of corresponding point CPb in the camera image and the projection position PP in the camera image. As described above, the projection position PP is projected position of the corresponding point CPa in the background light image by performing the coordinate transformation. For example, the projection error PE may be represented by the distance between the position of the corresponding point CPb in the camera image and the projection position PP. Alternatively, the projection error PE may be represented by an angle converted from the projection error based on an optical system of the light receiver 22. The result of the detected projection error PE is stored in the storage 33. For example, a data set including detection date and time, detection source image, and the value of the detected projection error PE may be successively stored as the projection error detection data 48 every time the data set is detected.

The abnormality determination unit 45 determines an abnormality occurred in peripheral object recognition based on the projection error PE detected by the projection error detection unit 44. The abnormality includes a failure of the peripheral object recognition function, a decrease of peripheral object recognition accuracy to a level lower than an allowable threshold, and a high possibility of accuracy decrease. When the projection error PE has a large value, it is estimated that an abnormality occurs in the transformation matrix or an abnormality occurs in the distance information measured by the distance measuring sensor 10.

The abnormality determination unit 45 adopts multiple (for example, three) determination conditions while referring to the projection error detection data 48 by accessing to the storage 33. The abnormality determination unit 45 determines that an abnormality occurs in peripheral object recognition when one or more of the multiple determination conditions are satisfied. The abnormality determination unit 45 determines that there is no abnormality in peripheral object recognition when none of the determination conditions is satisfied.

The first condition is set in a case where multiple pairs of corresponding points CPa and CPb are acquired from one reflected light image ImR and one camera image ImC, and the projection error PE is detected for each pair of the corresponding points. Herein, the one reflected light image ImR and one camera image ImC have the corresponding relationship. The first condition is set to be satisfied when the abnormality determination unit 45 determines that a quantity of the detected corresponding points pair having the projection error equal to or greater than a predetermined value A is equal to or greater than a predetermined detection quantity K. Herein, the predetermined detection quantity K is set to be equal to or greater than 2. The predetermined value A is a noise reduction value for removing noise data. By appropriately setting the predetermined value A, noise data affected by the vehicle vibration caused by the internal combustion engine of the vehicle 1 can be removed. The predetermined detection quantity K is a detection count number for assuring reliability of abnormality determination, and is set to an integer equal to or greater than 2.

The second condition is set in a case where multiple recent projection errors PE, for example, the projection errors PE acquired in N times of detection detected most recently are determined with regardless of whether the multiple corresponding points CPa and CPb are acquired from one reflected light image ImR and one camera image ImC. The second condition is set to be satisfied when the abnormality determination unit 45 determines that an average value of the projection errors PE of the predetermined multiple N times detected most recently is equal to or greater than a predetermined value B. The predetermine number N is a count number for ensuring reliability of abnormality determination, and is set to an integer equal to or greater than 2. The predetermined value B is an allowable value of projection error for maintaining an accuracy of the objection recognition, and is set based on a recognition performance of the object recognition executed by the driving assist ECU 50. The predetermined value B may be set to the same value as the predetermined value A, or may be set to a different value from the predetermined value A.

Figure 7:
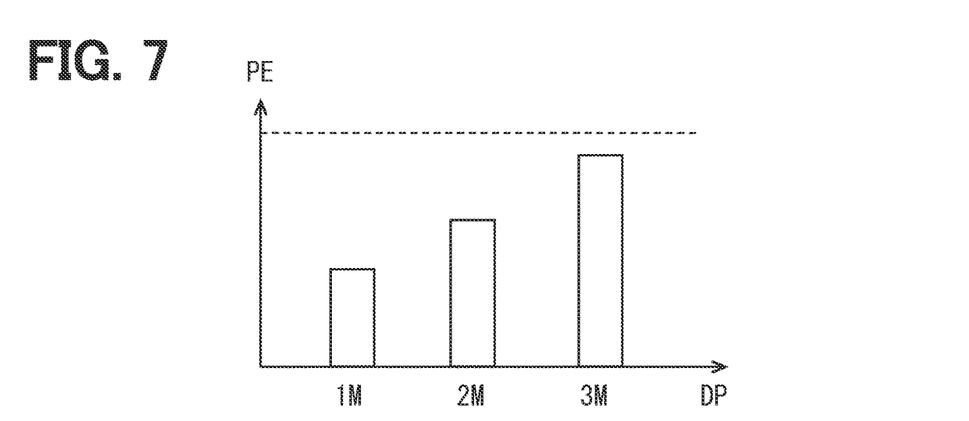
FIG. 7 is a graph showing an increase of the projection error according to the first embodiment.

The third condition is set based on a change of the projection error PE during a relatively long time period. The third condition is set to be satisfied when the abnormality determination unit 45 determines that the projection error PE continuously increases. As shown in FIG. 7, the abnormality determination unit 45 classifies the projection errors PE into multiple time periods DP (for example, for each month) based on the detection date and time of the projection error detection data 48. The abnormality determination unit 45 compares the multiple projection errors PE included in each time period DP with one another. For example, as shown in FIG. 7, supposed that the projection errors are detected during recent three months including the oldest month 1M, the second oldest month 2M, and the most recent month 3M. When the projection error PE is increased in each time period DP compared with one time period before, the abnormality determination unit 45 determines that the projection error PE increases in continuous manner.

When the abnormality determination unit 45 determines that an abnormality exists in peripheral object recognition, the abnormality notification information output unit 46 generates abnormality notification information for notifying the abnormality, and outputs the abnormality notification information to an output destination. For example, the output destination may be an information presenting device, such as a meter, a HUD, a speaker of the vehicle 1. When the information presenting device notifies the occupant of the abnormality, the occupant can take various measures.

The output destination may be an information collection center disposed outside of the vehicle 1, and the vehicle 1 may communicate with output destination using a data communication module (DCM). The DCM is a communication module equipped to the vehicle 1. The DCM transmits and receives radio waves to and from base stations around the vehicle 1 by wireless communication compliant with communication standards such as long term evolution (LTE) and 5G. When the vehicle 1 is a business vehicle, such as a manned taxi vehicle, a manned bus vehicle, a rental car, a sharing vehicle, or an unmanned transport vehicle, an abnormality is notified to the information collection center provided at a business establishment.

Figure 8:
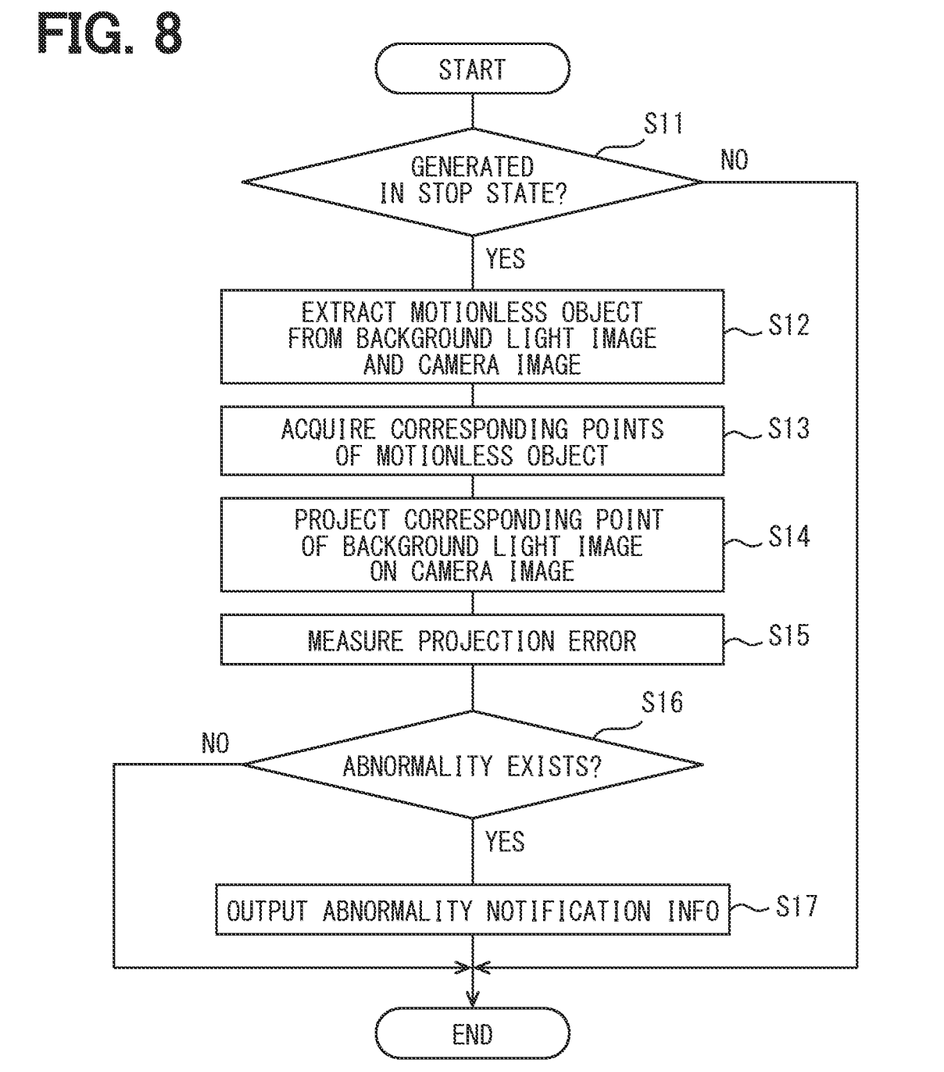
FIG. 8 is a flowchart showing a process executed by the image processing ECU according to the first embodiment.

The following will describe details of the abnormality detection method for detecting an abnormality in peripheral object recognition with reference to a flowchart shown in FIG. 8. The abnormality detection method is implemented by a processor executing an abnormality detection program stored in the storage.

In S11, the projection error detection unit 44 determines whether the background light image ImL and the camera image ImC are generated in a stop state, that is, a motionless state of the vehicle 1. When an affirmative determination is made in S11, the process proceeds to S12. When a negative determination is made in S11, the process shown in FIG. 8 is ended.

In S12, the projection error detection unit 44 extracts a motionless object SO that is commonly included in the background light image ImL and the camera image ImC. After the process in S12, the process proceeds to S13.

In S13, the projection error detection unit 44 acquires the corresponding points CPa and CPb of the motionless object SO extracted in S12. After the process in S13, the process proceeds to S14.

In S14, the projection error detection unit 44 projects the corresponding point CPa in the background light image on the projection position PP of the camera image. After the process in S14, the process proceeds to S15.

In S15, the projection error detection unit 44 measures the projection error PE based on the projection position PP projected on the camera image in S14 and the corresponding point CPb in the camera image. The detection result of projection error PE is stored as the projection error detection data 48. After the process in S15, the process shifts to S16.

In S16, the abnormality determination unit 45 determines whether an abnormality exists in peripheral object recognition with reference to the projection error detection data 48. When determining that the abnormality exists in S16, the process proceeds to S17. When determining no abnormality exists in S16, the process is ended.

In S17, the abnormality notification information output unit 46 outputs the abnormality notification information to the output destination. After S17, the process is ended. As described above, the image processing ECU 30 can detect an abnormality in the recognition of peripheral object of the vehicle 1.

(Operation Effects)

Operation effects of the first embodiment will be described below.

According to the first embodiment, the projection error PE between the background light image ImL and the camera image ImC is detected when the vehicle 1 travels at a speed lower than a predetermined low speed. In such a speed state, it is possible to suppress a decrease in detection accuracy, which is caused by a measurement time difference between a measurement time of the background light image ImL generated by the distance measuring sensor 10 and a measurement time of the camera image ImC generated by the external view camera 20. When the vehicle 1 moves during the measurement time difference, a position of the object included in the background light image ImL is different from a position of the object included in the camera image ImC. By detecting the projection error in the above-described speed state, it is possible to reduce the position difference between the background light image and the camera image. Thus, even when the position difference is included in the projection error PE, it is possible to suppress an increase of the projection error PE caused by the position difference. Thus, it is possible to detect, with a high accuracy, an abnormality occurred in the recognition of peripheral object existing around the vehicle 1 using the distance measuring sensor 10 and the external view camera 20.

According to the first embodiment, the projection error PE between the background light image ImL and the camera image ImC is detected when the vehicle 1 is in stop state. In the stop state, the difference between the position of object in the background light image ImL and the position of object in the camera image ImC, which is caused only by the movement of the vehicle 1 during the measurement time difference, can be eliminated. Thus, it is possible to prevent the position difference from being included in the projection error PE. Thus, it is possible to detect, with a high accuracy, an abnormality occurred in the recognition of peripheral object existing around the vehicle 1 using the distance measuring sensor 10 and the external view camera 20.

According to the first embodiment, for the multiple pairs of the corresponding points CPa and CPb in the background light image ImC and the camera image ImC, the three-dimensional coordinates P (x, y, z) of the corresponding point CPa in the background light image is specified using the distance information. Since the projection source, that is, the corresponding point CPa in the background light image has the three-dimensional coordinates P (x, y, z), when the projection source is projected on the projection position PP of the camera image ImC, the position accuracy of the projection position PP can be significantly improved. Thus, the projection error PE can be easily detected by measuring the difference between the position of the corresponding point CPb in the camera image and the projection position PP projected on the image plane of the camera image ImC.

According to the first embodiment, the abnormality in peripheral object recognition is determined based on the detected projection error PE. By using the projection error PE detected with high accuracy, the accuracy of abnormality determination can also be increased.

According to the first embodiment, the abnormality is determined to be existing in the peripheral object recognition when the abnormality determination unit 45 determines that the quantity of the detected corresponding points pair having the projection error equal to or greater than the predetermined value A is equal to or greater than the predetermined detection quantity K. Herein, the predetermined detection quantity K is set to an integer equal to or greater than 2. By considering multiple projection error PE for one set of the background light image and the camera image, the reliability of abnormality determination can be significantly improved.

According to the first embodiment, the abnormality is determined to be existing in the peripheral object recognition when the abnormality determination unit 45 determines that the average value of the projection errors PE of the predetermined multiple N times detected most recently is equal to or greater than the predetermined value B. By considering the average value of the projection errors PE of the predetermined multiple N times detected most recently, the reliability of the abnormality determination can be significantly improved.

According to the first embodiment, the abnormality is determined to be existing in the peripheral object recognition when the abnormality determination unit 45 determines that the projection error PE continuously increases. By checking the continuous increase of the projection error PE, it is possible to take measures, in advance, to prevent a circumstance in which the projection error PE predicted in the future is increased to an unacceptable level.

Other Embodiments

Although one embodiment has been described, the present disclosure should not be limited to the above embodiment and may be applied to various other embodiments within the scope of the present disclosure.

As a first modification, the projection error detection unit 44 may determine whether the background light image ImC and the camera image ImC, which are the detection targets of the projection error PE, are generated in a state (hereinafter, referred to as a low speed state) where the vehicle travels at a speed lower than a predetermined low speed range. The low speed state includes the motionless state of the vehicle 1 and a low speed traveling state of the vehicle 1 in which the vehicle 1 travels at a speed lower than the predetermined low speed range. The low speed range in the present embodiment is a speed range lower than an allowable upper limit speed required to ensure the detection accuracy of the projection error PE. The value of the allowable upper limit speed may be changed in consideration of the image measurement specifications such as the frame rate and the shutter speed in the distance measuring sensor 10 and the external view camera 20. For example, a value such as 10 km/h or 20 km/h may be adopted as the allowable upper limit speed. In the first modification, when the projection error detection unit 44 generates the background light image ImL and the camera image ImC in the motionless state or low speed travelling state of the vehicle 1, the projection error PE between the background light image ImL and the camera image ImC is detected.

As a second modification, the abnormality determination unit 45 does not have to consider above described multiple determination conditions. Alternatively, the abnormality determination unit 45 may determine only one of the determination conditions described in the first embodiment.

As a third modification, the camera image ImC may be a grayscale image instead of the color image described in the first embodiment.

As a fourth modification, at least one of the image processing ECU 30 and the driving assist ECU may not be equipped to the vehicle. Instead, at least one of the image processing ECU 30 and the driving assist ECU may be installed outside of the vehicle, such as on the road side or on a different vehicle. In this case, abnormality detection, driving operation, etc. may be remotely controlled by communication such as the Internet, road-to-vehicle communication, or vehicle-to-vehicle communication.

As a fifth modification, the object recognition abnormality detection apparatus provided by the image processing ECU 30 and an object recognition apparatus provided by the driving assist ECU 50 may be integrated as one electronic control device that has composite functions.

As a sixth modification, the object recognition abnormality detection apparatus may be an apparatus specialized for abnormality detection purpose without an image registration function.

As a seventh modification, the respective functions provided by the image processing ECU 30 can be also provided by software and hardware for executing the software, only software, only hardware, and complex combinations of software and hardware. In cases where functions are provided by electronic circuits as hardware, the functions can be also provided by analog circuits or digital circuits which include a large number of logic circuits.

As an eighth modification, the form of the storage medium for storing the abnormality detection program that is capable of executing the abnormality detection method for object recognition may be changed as appropriate. For example, the storage medium is not limited to the configuration provided on the circuit board, and may be provided in the form of a memory card or the like. The storage medium may be inserted into a slot portion, and electrically connected to the control circuit of the image processing ECU 30. Further, the storage medium may be an optical disk or a hard disk as a copy base of the program of the image processing ECU 30.

The processor and the method thereof which have been described in the present disclosure may be also implemented by a special purpose computer which includes a processor programmed to execute one or more functions implemented by computer programs. Alternatively, the apparatus and the method described in the present disclosure may be implemented by a special purpose hardware logic circuit. Alternatively, the apparatus and the method described in the present disclosure may be implemented by one or more special purpose computers configured by a combination of a processor executing a computer program and one or more hardware logic circuits. Further, the computer program may be stored in a computer-readable non-transitory tangible storage medium as instructions executed by a computer.

What is claimed is:

1. An object recognition abnormality detection apparatus equipped to a vehicle and detecting an abnormality occurred in a peripheral object recognition of the vehicle using a distance measuring sensor and an external view camera, the distance measuring sensor being equipped to the vehicle and generating a reflected light image, which includes distance information, by emitting light toward an object and sensing, with a light receiving element, reflected light from the object, the distance measuring sensor further generating a background light image, which has a same coordinate system as a coordinate system of the reflected light image, by sensing, with the light receiving element, background light with respect to the reflected light, the external view camera being equipped to the vehicle and generating a camera image by sensing incident light with a camera element, the object recognition abnormality detection apparatus comprising:
   a speed state acquiring unit acquiring a speed state of the vehicle;
   an image information acquisition unit acquiring the background light image and the camera image; and
   a projection error detection unit detecting a projection error between the background light image and the camera image under a condition that the background light image and the camera image are generated in the speed state where a speed of the vehicle is within a range lower than a predetermined speed.

2. The object recognition abnormality detection apparatus according to claim 1, wherein
   the projection error detection unit detects the projection error between the background light image and the camera image in a case where the background light image and the camera image are generated in a stop state of the vehicle.

3. The object recognition abnormality detection apparatus according to claim 1, wherein
   the projection error detection unit:
      acquires a corresponding point in the background light image and a corresponding point in the camera image, which correspond to one another;
      specifies three-dimensional coordinates of the corresponding point in the background light image with reference to the distance information of the reflected light image;
      projects the three-dimensional coordinates of the corresponding point in the background light image on a projection position included in an image plane of the camera image; and
      detects, as the projection error, a position difference between a position of the corresponding point in the camera image and the projection position in the camera image.

4. The object recognition abnormality detection apparatus according to claim 1, further comprising
   an abnormality determination unit that determines the abnormality occurred in the peripheral object recognition of the vehicle based on the projection error detected by the projection error detection unit.

5. The object recognition abnormality detection apparatus according to claim 4, wherein
   the abnormality determination unit determines that the abnormality is occurred in the peripheral object recognition of the vehicle in a case where a quantity of the detected projection errors, which are detected one paired background light image and camera image and have values being equal to or greater than a predetermined value, is equal to or greater than a predetermined detection quantity.

6. The object recognition abnormality detection apparatus according to claim 4, wherein
   the abnormality determination unit determines that the abnormality is occurred in the peripheral object recognition of the vehicle in a case where an average value of the projection errors, which are detected in most recent predetermined multiple times, is equal to or greater than a predetermined value.

7. The object recognition abnormality detection apparatus according to claim 4, wherein
   the abnormality determination unit determines that the abnormality is occurred in the peripheral object recognition of the vehicle in a case where the projection error continuously increases.

8. The object recognition abnormality detection apparatus according to claim 4, further comprising
   an abnormality notification information output unit that outputs an abnormality output information to an output destination in response to the abnormality determination unit determining that the abnormality being occurred in the peripheral object recognition of the vehicle.

9. An object recognition abnormality detection program product stored in a computer-readable non-transitory storage medium, the program product comprising instructions to be executed by at least one processor for detecting an abnormality occurred in a peripheral object recognition of a vehicle, the instructions comprising:
   acquiring a reflected light image and a background light image from a distance measuring sensor equipped to the vehicle, the distance measuring sensor generating the reflected light image, which includes distance information, by emitting light toward an object and sensing, with a light receiving element, reflected light from the object, and the distance measuring sensor further generating the background light image, which has a same coordinate system with the reflected light image, by sensing, with the light receiving element, background light with respect to the reflected light;
   acquiring a camera image generated by an external view camera equipped to the vehicle, the external view camera generating the camera image by sensing incident light with a camera element; and
   detecting a projection error between the background light image and the camera image under a condition that the background light image and the camera image are generated in a speed state where a speed of the vehicle is within a range lower than a predetermined speed.

10. An object recognition abnormality detection method of detecting an abnormality occurred in a peripheral object recognition of a vehicle, the method being executed by at least one processor and comprising:
    acquiring a reflected light image and a background light image from a distance measuring sensor equipped to the vehicle, the distance measuring sensor generating the reflected light image, which includes distance information, by emitting light toward an object and sensing, with a light receiving element, reflected light from the object, and the distance measuring sensor further generating the background light image, which has a same coordinate system with the reflected light image, by sensing, with the light receiving element, background light with respect to the reflected light;

acquiring a camera image generated by an external view camera equipped to the vehicle, the external view camera generating the camera image by sensing incident light with a camera element; and detecting a projection error between the background light image and the camera image under a condition that the background light image and the camera image are generated in a speed state where a speed of the vehicle is within a range lower than a predetermined speed.

* * * * *